(12) United States Patent
Chen et al.

(10) Patent No.: US 11,068,191 B2
(45) Date of Patent: Jul. 20, 2021

(54) ADAPTIVE REPLICATION MODES IN A STORAGE SYSTEM

(71) Applicant: EMC IP Holding Company LLC, Hopkinton, MA (US)

(72) Inventors: Xiangping Chen, Sherborn, MA (US); Ying Hu, Northborough, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 131 days.

(21) Appl. No.: 16/254,897

(22) Filed: Jan. 23, 2019

(65) Prior Publication Data

US 2020/0233581 A1 Jul. 23, 2020

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01); *G06F 3/0653* (2013.01)

(58) Field of Classification Search
CPC ...... G06F 3/065; G06F 3/0619; G06F 3/0653; G06F 3/067; G06F 12/00; G06F 13/00
USPC ......................................... 711/100, 154, 162
See application file for complete search history.

(56) References Cited

U.S. PATENT DOCUMENTS

| | | | |
|---|---|---|---|
| 5,504,861 A | 4/1996 | Crockett et al. | |
| 5,615,329 A | 3/1997 | Kern et al. | |
| 7,278,049 B2 | 10/2007 | Bartfai et al. | |
| 7,475,124 B2 | 1/2009 | Jiang et al. | |
| 8,327,103 B1 | 12/2012 | Can et al. | |
| 8,332,354 B1 | 12/2012 | Chatterjee et al. | |
| 8,380,928 B1 | 2/2013 | Chen et al. | |
| 8,429,346 B1 | 4/2013 | Chen et al. | |
| 8,515,911 B1 | 8/2013 | Zhou et al. | |
| 8,539,148 B1 | 9/2013 | Chen et al. | |
| 8,566,483 B1 | 10/2013 | Chen et al. | |
| 8,583,607 B1 | 11/2013 | Chen et al. | |
| 8,683,153 B1 | 3/2014 | Long et al. | |
| 8,712,976 B1 | 4/2014 | Chen et al. | |
| 8,751,878 B1 | 6/2014 | Don et al. | |
| 8,775,388 B1 | 7/2014 | Chen et al. | |
| 8,782,324 B1 | 7/2014 | Chen et al. | |

(Continued)

OTHER PUBLICATIONS

Notice of Allowance and Issue Fee Due dated May 5, 2020, U.S. Appl. No. 16/042,363, 9 pages.

(Continued)

*Primary Examiner* — Tuan V Thai
(74) *Attorney, Agent, or Firm* — Daly, Crowley, Mofford & Durkee, LLP

(57) ABSTRACT

In one aspect, adaptive replication modes in a storage system are provided. An aspect includes during an active replication session in which a first type of replication is performed at the storage system, monitoring write input/output (IO) operations, collecting data from the write IO operations, and determining, from the collected data, write IO latency. Upon determining that a threshold value has been met from the write IO latency, where the threshold value is defined for the first type of replication, an aspect includes automatically switching from the first type of replication to a second type of replication. The second type of replication is configured to compensate for operational deficiencies detected in response to the write IO latency.

15 Claims, 7 Drawing Sheets

(56) References Cited

U.S. PATENT DOCUMENTS

| | | |
|---|---|---|
| 8,799,601 B1 | 8/2014 | Chen et al. |
| 8,898,507 B1 | 11/2014 | Crable et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,606 B1 | 11/2017 | Byrne et al. |
| 9,817,766 B1 | 11/2017 | Si et al. |
| 10,037,369 B1 | 7/2018 | Bono et al. |
| 10,068,002 B1 * | 9/2018 | Wilczynski ............. G06F 16/27 |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 2005/0021751 A1 | 1/2005 | Block et al. |
| 2005/0071708 A1 | 3/2005 | Bartfai et al. |
| 2008/0232405 A1 | 9/2008 | Gallo |
| 2009/0164531 A1 | 6/2009 | Tanaka et al. |
| 2011/0321041 A1 | 12/2011 | Bhat et al. |
| 2014/0279897 A1 | 9/2014 | Bourbonnais et al. |
| 2016/0048408 A1 | 2/2016 | Madhu et al. |
| 2016/0139823 A1 | 5/2016 | Costea et al. |
| 2016/0239396 A1 | 8/2016 | Deng et al. |
| 2017/0149870 A1 | 5/2017 | Arnold et al. |
| 2017/0185323 A1 | 6/2017 | Kaushik et al. |
| 2017/0192857 A1 | 7/2017 | Meiri et al. |
| 2017/0262520 A1 | 9/2017 | Mitkar et al. |
| 2019/0163370 A1 | 5/2019 | Sure et al. |
| 2019/0278663 A1 | 9/2019 | Metha et al. |
| 2019/0356609 A1 | 11/2019 | Grunwald et al. |

OTHER PUBLICATIONS

U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.
Non-Final Office Action dated Mar. 30, 2020, U.S. Appl. No. 16/042,363, 18 pages.
Response to Non-Final Office Action filed Apr. 15, 2020, U.S. Appl. No. 16/042,363, 13 pages.
Non-Final Office Action dated Mar. 31, 2020, U.S. Appl. No. 16/038,543, 40 pages.
Response to Non-Final Office Action filed Apr. 10, 2020. U.S. Appl. No. 16/038,543, 14 pages.
Response to U.S. Final Office Action dated Jan. 21, 2021 for U.S. Appl. No. 16/038,543; Response filed Mar. 3, 2021; 12 pages.
Advisory Action dated Mar. 11, 2021 for U.S. Appl. No. 16/038,543; 7 pages.
U.S. Final Office Action dated Jan. 21, 2021 for U.S. Appl. No. 16/038,543; 42 pages.
U.S. Non-Final Office Action dated Jul. 30, 2020 for U.S. Appl. No. 16/038,543; 39 pages.
Response to U.S. Non-Final Office Action dated Jul. 30, 2020 for U.S. Appl. No. 16/038,543; Response filed Oct. 1, 2020; 17 pages.

* cited by examiner

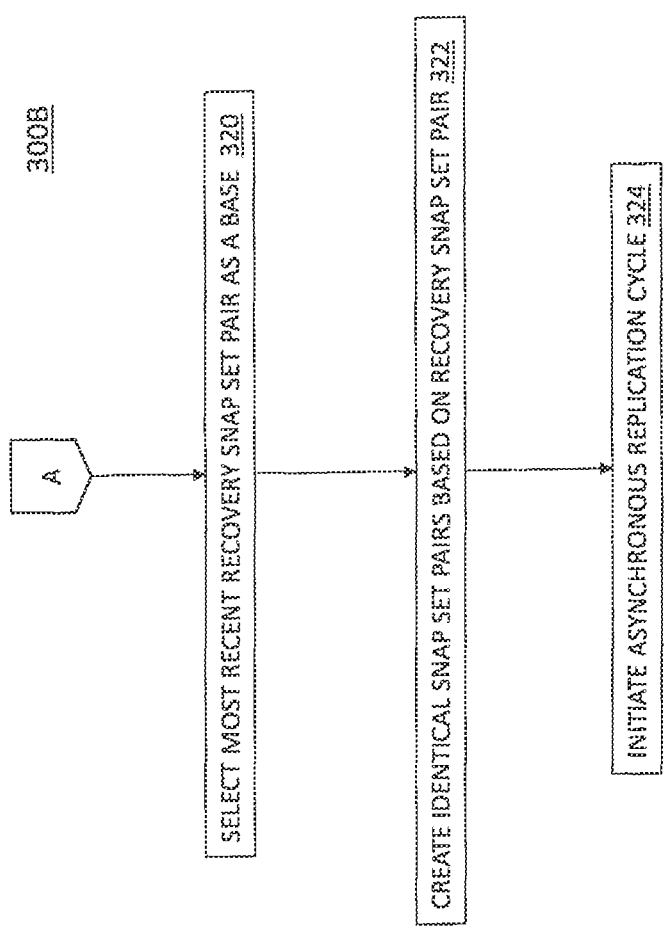

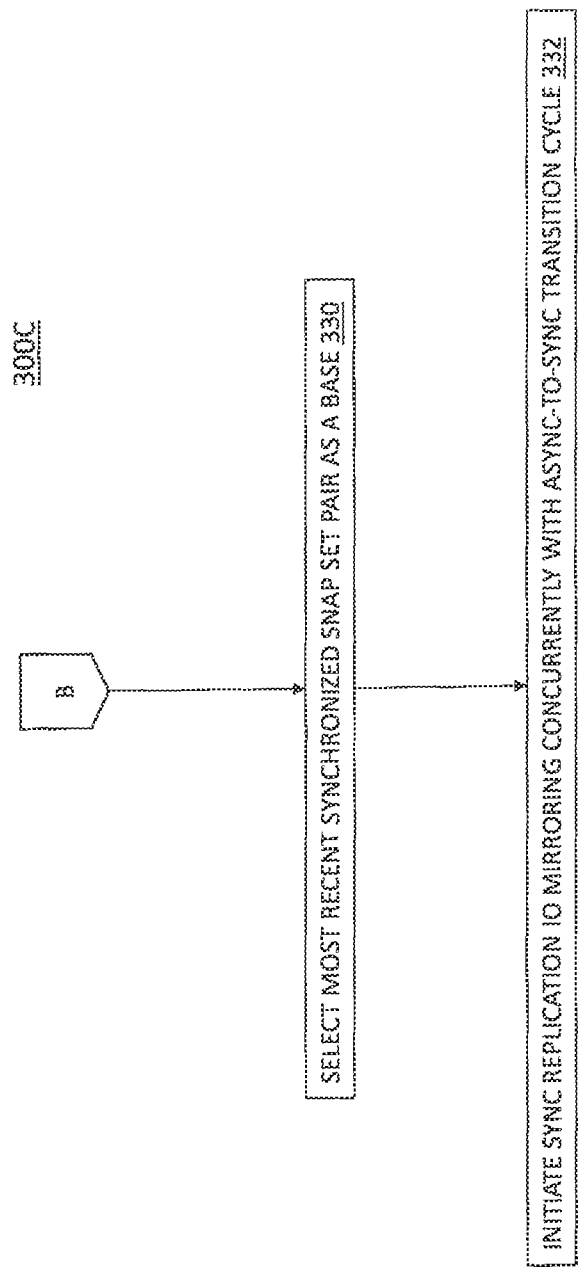

ADAPTIVE REPLICATION MODES IN A STORAGE SYSTEM

BACKGROUND

Synchronous (sync) replication is a business continuity process that mirrors data updates between two systems to prevent data loss and downtime. When sync replication is turned on for a production storage object, the system mirrors the data to a target system as part of handling write requests from an initiator, and only responds to the initiator after the writes have been persisted on both the source and target systems.

In asynchronous (async) replication, once data has been written to a primary storage or production location, additional write operations to the primary storage can be performed without having to wait for the secondary or target storage site to complete its write operations.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to provide adaptive replication in a storage system. The method includes, during an active replication session in which a first type of replication is performed at the storage system, monitoring write input/output (IO) operations, collecting data from the write IO operations, and determining, from the collected data, write IO latency. Upon determining that a threshold value has been met from the write IO latency, where the threshold value is defined for the first type of replication, the method includes automatically switching from the first type of replication to a second type of replication. The second type of replication is configured to compensate for operational deficiencies detected in response to the write IO latency.

Another aspect may provide a system to provide adaptive replication in a storage system. The system includes a memory having computer-executable instructions. The system also includes a processor operated by a storage system. The processor executes the computer-executable instructions. When executed by the processor, the computer-executable instructions cause the processor to perform operations. The operations include, during an active replication session in which a first type of replication is performed at the storage system, monitoring write input/output (IO) operations, collecting data from the write IO operations, and determining, from the collected data, write IO latency. Upon determining that a threshold value has been met from the write IO latency, where the threshold value is defined for the first type of replication, the operations include automatically switching from the first type of replication to a second type of replication. The second type of replication is configured to compensate for operational deficiencies detected in response to the write IO latency.

Another aspect may provide a computer program product embodied on a non-transitory computer readable medium. The computer program product includes instructions that, when executed by a computer at a storage system, causes the computer to perform operations. The operations include, during an active replication session in which a first type of replication is performed at the storage system, monitoring write input/output (IO) operations, collecting data from the write IO operations, and determining, from the collected data, write IO latency. Upon determining that a threshold value has been met from the write IO latency, where the threshold value is defined for the first type of replication, the operations include automatically switching from the first type of replication to a second type of replication. The second type of replication is configured to compensate for operational deficiencies detected in response to the write IO latency.

BRIEF DESCRIPTION OF THE DRAWINGS

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIGS. 3A-3C are flow diagrams of processes for performing adaptive replication in a storage system in accordance with an illustrative embodiment.

DETAILED DESCRIPTION

Figure 1:
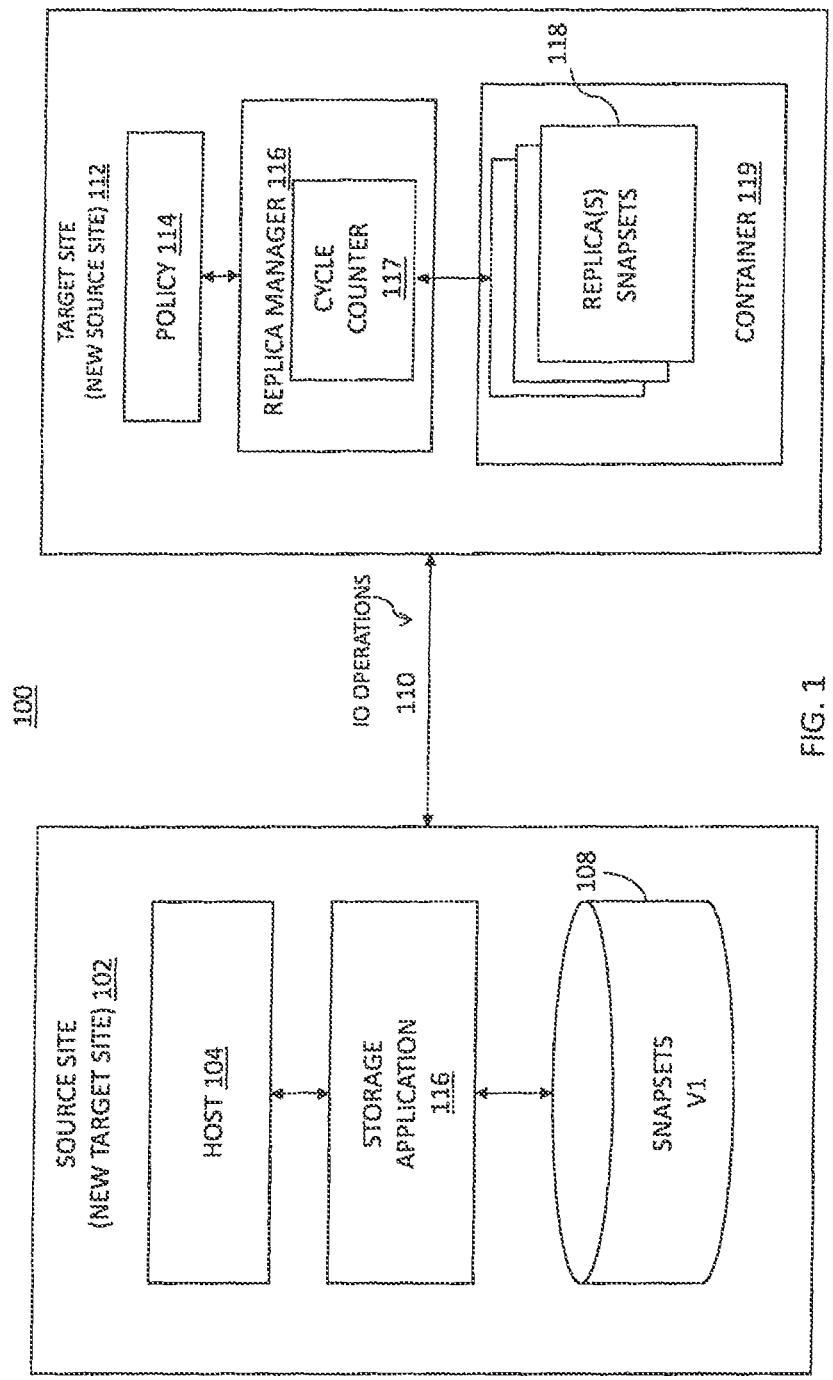
FIG. 1 is a block diagram of a storage system to perform adaptive replication in accordance with an illustrative embodiment.

Synchronous (sync) replication and asynchronous (async) replication offer certain benefits but are also known to have certain disadvantages. For example, one advantage to sync replication is that there is typically no data loss during site disaster recovery, and no additional on disk data and metadata read operations, as incoming data gets mirrored to the remote site during the write operations. In addition, sync replication by design also offers reduced snap creation/deletion operations, which can reduce latencies in the replication process. On the other hand, when using sync replication a user may experience higher IO latency or even IO timeouts if the system is overloaded, or when there is network congestion between a source and target site. In other words, while sync replication provides greater protection; it requires that the system have sufficient capacity and that the data update patterns are relatively consistent.

In async replication, there is little impact on the host IO latency as data is replicated by a background process after it has been written. Potentially, much less data could be replicated using techniques such as write aggregation, compression, and deduplication. Another advantage of async replication is that is allows more control over how the process uses system resources via recovery point objectives (RPOs) and bandwidth limits' settings, etc. It also adds system load by periodically creating/deleting snap sets, and reading/scanning snap data content for data replication. Increases to RPO setting of async replication reduce burden and async replication snap creation/deletion/scan overhead. However, it also increases the replication lag time between the source and target systems. In addition, during disaster recovery, there may be increased lag times between the source and target systems, as the content on the target may not be up to date.

In the embodiments described herein, adaptive replication modes for a storage system are provided in which criteria may be used to identify latencies and automatically switch from one replication mode to another (e.g., from sync to async and from async to sync). With the support of a seamless and automatic transition between replication modes, customers can be relieved of the burden of understanding changing system needs and manually rendering a mode change.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" or "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a timestamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Turning now to FIG. 1, an example storage system 100 for performing adaptive replication will now be described. Storage system 100 may include at least one source site 102 and at least one target site 112. In an embodiment, target site 112 is either co-located with source site 102 or is in close geographic proximity (e.g., within the same building or building complex) with the source site 102. In other embodiments, target site 112 is remotely located from the source site 102. For example, target site 112 may be geographically dispersed across cities, states, or even countries with respect to source site 102.

Source site 102 may include a host 104, a storage application 106, and data storage 108. In some embodiments, data storage 108 may include one or more storage volumes (e.g., V1), that operate as active, or production, volumes.

Host 104 may perform I/O operations on storage 108 (e.g., read data from and write data to storage 108). In some embodiments, the I/O operations may be intercepted by and controlled by the storage application 106. As changes are made to data stored on storage 108 via the I/O operations from host 104, or over time as storage system 100 operates, storage application 106 may perform data replication from the source site 102 to the target site 112 over a communication network 110.

In some embodiments, the communication network 110 may include internal (e.g., short distance) communication links (not shown) to transfer data between storage volumes for storing replicas 118 (also referred to herein as snap sets), such as an InfiniBand (IB) link or Fibre Channel (FC) link. In other embodiments, the communication link 110 may be a long-distance communication network of a storage area network (SAN), e.g., over an Ethernet or Internet (e.g., TCP/IP) link that may employ, for example, the iSCSI protocol.

In illustrative embodiments, storage system 100 may employ a snap set (or replication) mechanism to replicate data between source site 102 and target site 112. A snap set (or replica) may be created from data within storage 108 and transferred to the target site 112 during a data replication cycle using a data replication process.

Data replication may be performed based on data replication policies that may define various settings for data recovery operations, shown as policy 114 in target site 112. For example, policy 114 may define a plurality of attributes, such as a frequency with which replicas are generated and how long each replica 118 is kept at target site 112. In some embodiments, policy 114 defines metrics for use in snap set creation and replication process determinations.

Policy 114 may define attributes for determining when to switch replication modes between synchronous replication and asynchronous replication. In embodiments, the policy 114 may define customer-selected requirements with respect to operational efficiencies. For example, a customer may indicate a desire or preference to use synchronous replication unless or until existing activities are impacted by performance and/or data safety issues, and then the customer desires to use async replication. As the customer may not know in advance how and when the system may become impacted by issues, the adaptive replication mode processes described herein provide a technique to monitor system performance, determine latency indicators, and automatically switch between replication modes based on customer-provided criteria. When the processes determine that latency issues are no longer a factor, the processes can automatically switch back to sync replication mode. In embodiments, the policy 114 may include one or more threshold values for use in rendering the replication mode determination. These attributes and threshold values are described further in FIGS. 3A-3C.

As described herein, in example embodiments, the data replication mode performed by the system may be synchronous data replication with snap sets created in dynamic intervals during operation of storage system 100. The timing of synchronous replication cycles and the retention of the replicas 118 may be managed by replica manager 116 of target site 112. In some embodiments, the data replication mode may be asynchronous data replication.

In addition to managing replicas 118 according to policy 114 (e.g., a replication and/or retention policy), the replica manager 116 may also include a cycle counter 117 to track generations of snap sets over time. In embodiments, replica manager 116 tracks timestamps of IO operations to facilitate latency determinations. For example, IO load between the source and target sites can impact data transfer activities.

The system can utilize the timestamps to assist in determining IO load, as well as other monitored conditions, such as current bandwidth availability.

It will be understood that the roles of the source site 102 and the target site 112 may be reversed in instances, e.g., in which an event occurring on the source site 102 causes the target site 112 to intercept I/Os and take on the role of snap set creation and replication to the source site. This role reversal is referred to as a failover event. In this manner, the processes described herein apply equally to the target site. In this instance, the source site 102 becomes the new target site, and the target site 112 becomes the new source site, as shown in FIG. 1.

Figure 2:
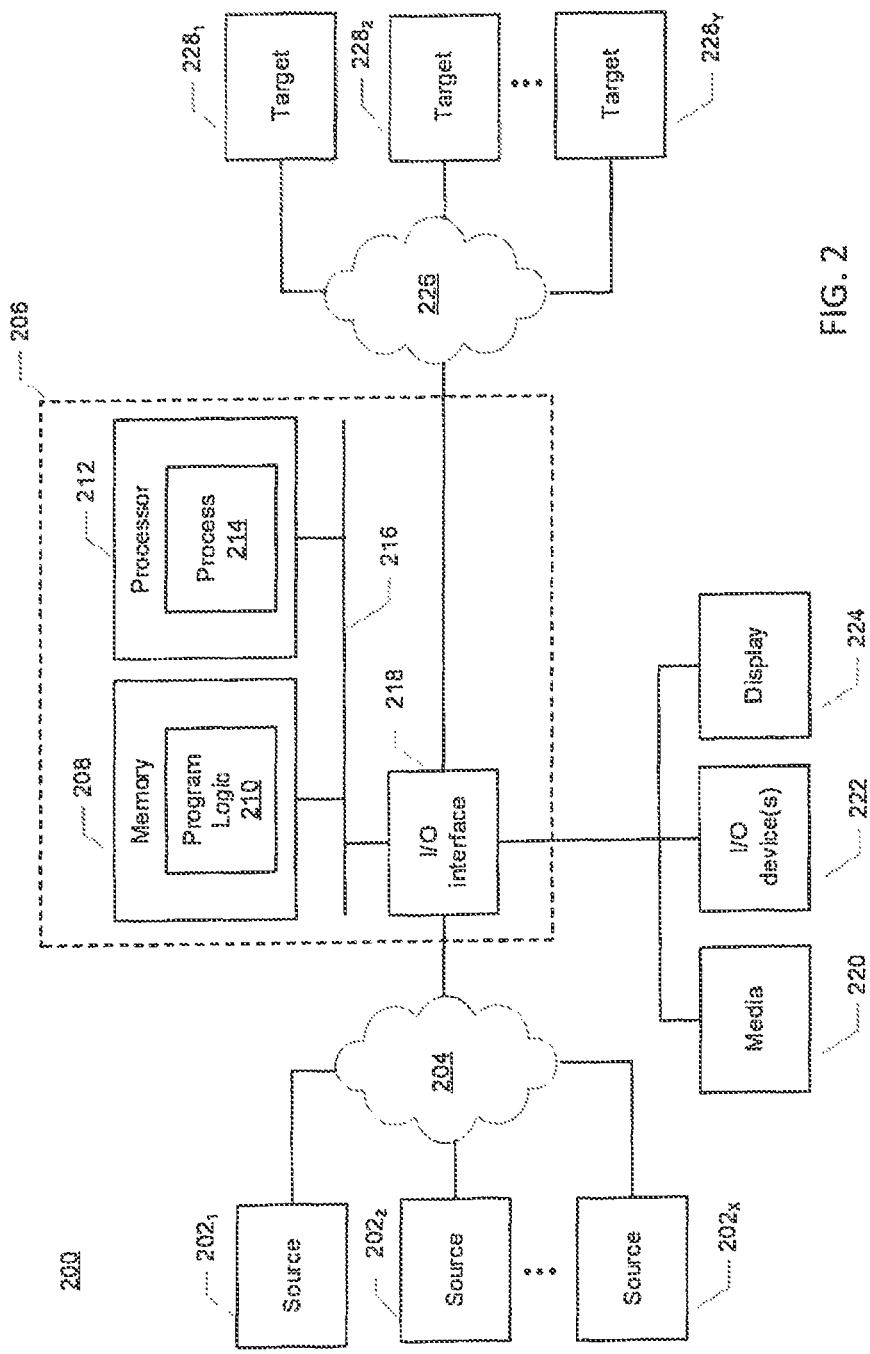
FIG. 2 is a block diagram of another storage system to perform adaptive replication in accordance with an illustrative embodiment.

Referring now to FIG. 2, in an illustrative embodiment, an apparatus 206 may form part of system 200 and include a memory 208 storing program logic 210, a processor 212 for executing a process 214, and a communications I/O interface 218, connected via a bus 216 to allow communication between memory 208, processor 212 and devices external to apparatus 206. Apparatus 206 may correspond to elements of the source site 102 of FIG. 1. For example, in some embodiments, communications I/O interface 218 may be coupled to apparatus 206, external media 220, one or more 110 devices 222, and a display device 224. In some embodiments, communications I/O interface 218 may couple apparatus 206 to one or more source devices $202_1$-$202_X$ via a network 204. Source devices $202_1$-$202_X$ may correspond to elements of the source site 102 in FIG. 1. In some embodiments, communications I/O interface 218 may couple apparatus 206 to one or more target devices $228_1$-$228_Y$ via networks 226. Target devices $228_1$-$228_Y$ may correspond to elements of the target site 112 in FIG. 1. In some embodiments, networks 226 of FIG. 2 may include a communication fabric between volumes of targets 228. For example, in some embodiments, networks 226 may include an Infini-Band (IB) network or a Fibre Channel (FC) network. Networks 226 may also include a long-distance communication network of a storage area network (SAN), e.g., over an Ethernet or Internet (e.g., TCP/IP) link that may employ, for example, the iSCSI protocol.

Figure 3A:
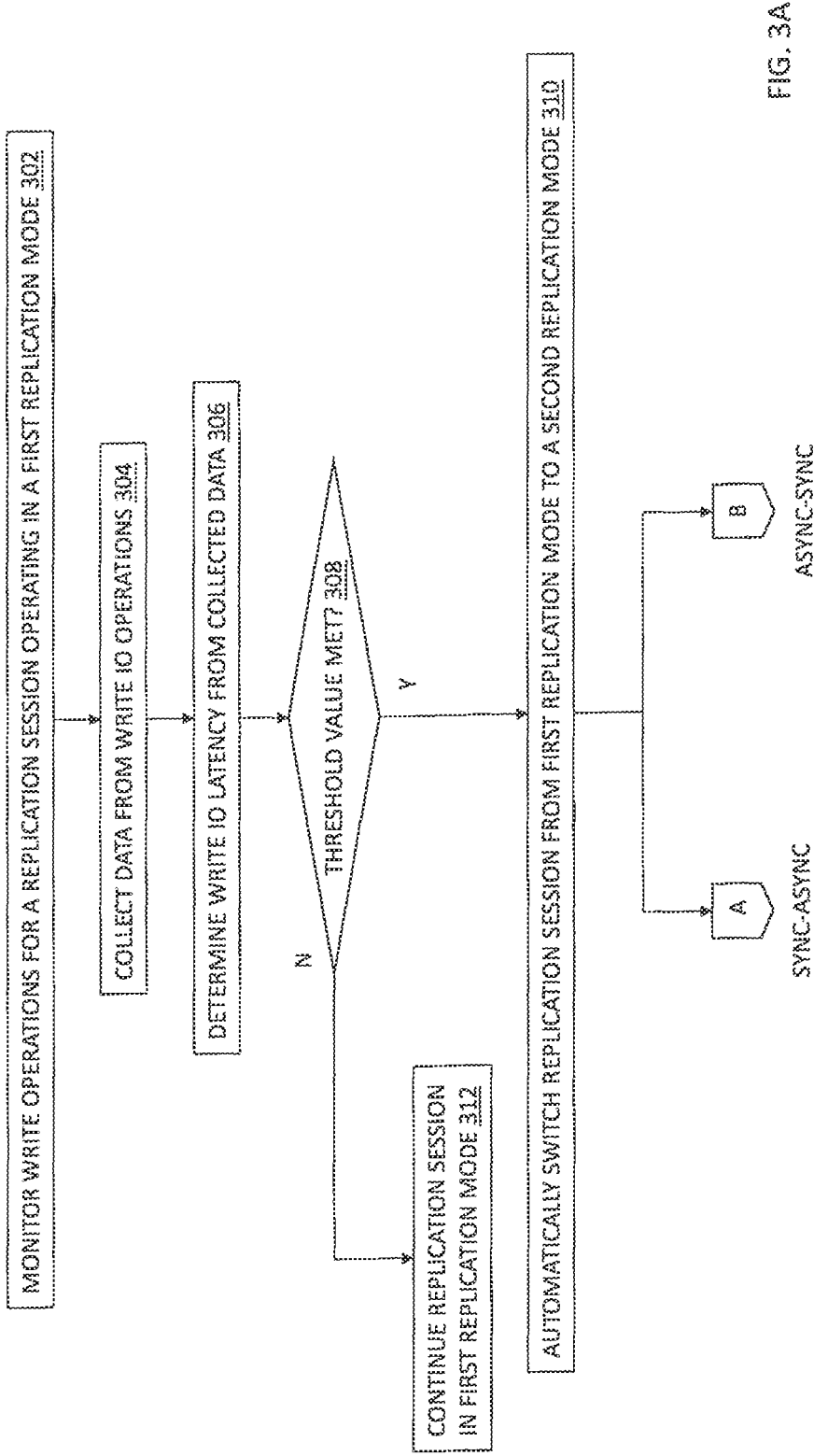

Turning now to FIGS. 3A-3C, flow diagrams of processes 300A-300C for implementing adaptive replication modes in a storage system will now be described. The Figures assume that the system (e.g., system 100/200) is in the process of an active replication session in which a first type (also referred to as "mode") of replication is used. The first type of replication may be either a synchronous mode or an asynchronous mode of replication.

In block 302, the system monitors the write IO operations from the replication session. For example, the system monitors snap sets created and replicated to the target system. Timestamps of snap sets are created and replicated to the target system. The system may also monitor other conditions, such as available bandwidth throughout the replication session. The system may further monitor performance issues, e.g., consistency group trips and recovery after a failed consistency group trip.

In block 304, data from the write IO operations is collected. For example, the data includes collecting timestamps associated with the creation and replication of snap sets between the source and target system to identify time differences in the data transfer. Over time, the system can identify from the collected data average latency of data transfer as well as peak latencies. These latencies are determined in block 306.

In block 308, it is determined whether a threshold value has been met. The threshold value used in the determination is a function of the mode of replication currently used. For example, if the first mode of replication being used is synchronous mode, the write IO latency may include a length of time taken to mirror the write IO operations from the source to the target. In this example, the threshold value is met when an average value of the write IO latency is persisted for a pre-defined amount of time. In another example, the threshold value may be met when the write IO latency for the sync mode of replication causes a consistency group trip and recovery after a failed consistency group trip.

For example, an unrecoverable error/panic may occur during sync replication data transfer, in which the data has been already persisted at the source. In this situation, the source data path may trigger a CG trip to preserve volume consistency on the target and then return an IO success notification back to the initiator upon a CG trip complete notification. In this scenario, the source and target are now out of sync, and the source stops sending data to the target for future IO requests until successful recovery, which can increase latency.

If the first mode of replication is asynchronous, the threshold value may be defined by an average and peak latency. The replication mode switch is triggered when the write IO latency average and peak IO latency falls below the defined threshold value.

Accordingly, in block 310, upon determining that the threshold value has been met for the mode of replication in use (either sync or async), the system automatically switches the replication mode from the first mode to the second mode. The second mode of replication is configured to compensate for operational deficiencies detected in response to the write IO latency.

FIG. 3B describes a process for automatically switching from the first replication mode to the second replication mode, when the first replication mode is synchronous and the second replication mode is asynchronous.

In block 320, a latest (most recent) recovery snap set pair is selected to use as a base to start a sync-to-async cycle which enables async replication data transfer. A recovery snap set includes a snap set that contains a subset of data content that is also stored at the target site and has a time of creation that is equal to or greater than a timeout value for serving input/outputs (IOs) to the target site. Recovery snap sets are further described in commonly assigned application, "Method to Support Synchronous Replication Failover," application Ser. No. 16/042,363, filed on Jul. 23, 2018, the entire contents of which are incorporated by reference herein in its entirety.

In block 322, identical snap set pairs are created based on the recovery snap set pair. In block 324, an asynchronous replication cycle is initiated. In order to switch from sync to async replication, a new transition cycle snap set is created against a production side consistency group on the source system, and a new transition cycle snap set is created on the target system against the last, or most recent, recovery snap set. The delta between the new transition cycle snap set and the last recovery snap set is transferred to the target side transition cycle snap set. At the end of the transition cycle, the transition cycle snap set on the source and target will be identical.

FIG. 3C describes a process for automatically switching from the first replication mode to the second replication mode, when the first replication mode is asynchronous and the second replication mode is synchronous.

In block 330, a most recent synchronized snap set pair is selected for use as a base. In block 332, the process begins synchronous replication 10 mirroring concurrently with an async-to-sync transition cycle, wherein full synchronization is reached at the completion of the async-to-sync transition cycle. In order to switch to sync (or metro) replication, on the target, a new active snap set is created against the last, or most recent async cycle snap set. Data mirroring is enabled from the source production consistency group to the target active snap set. The transition replication cycle is initiated and the delta between the production consistency group and the last async cycle snap set is transferred to the target active snap set.

Figure 4:
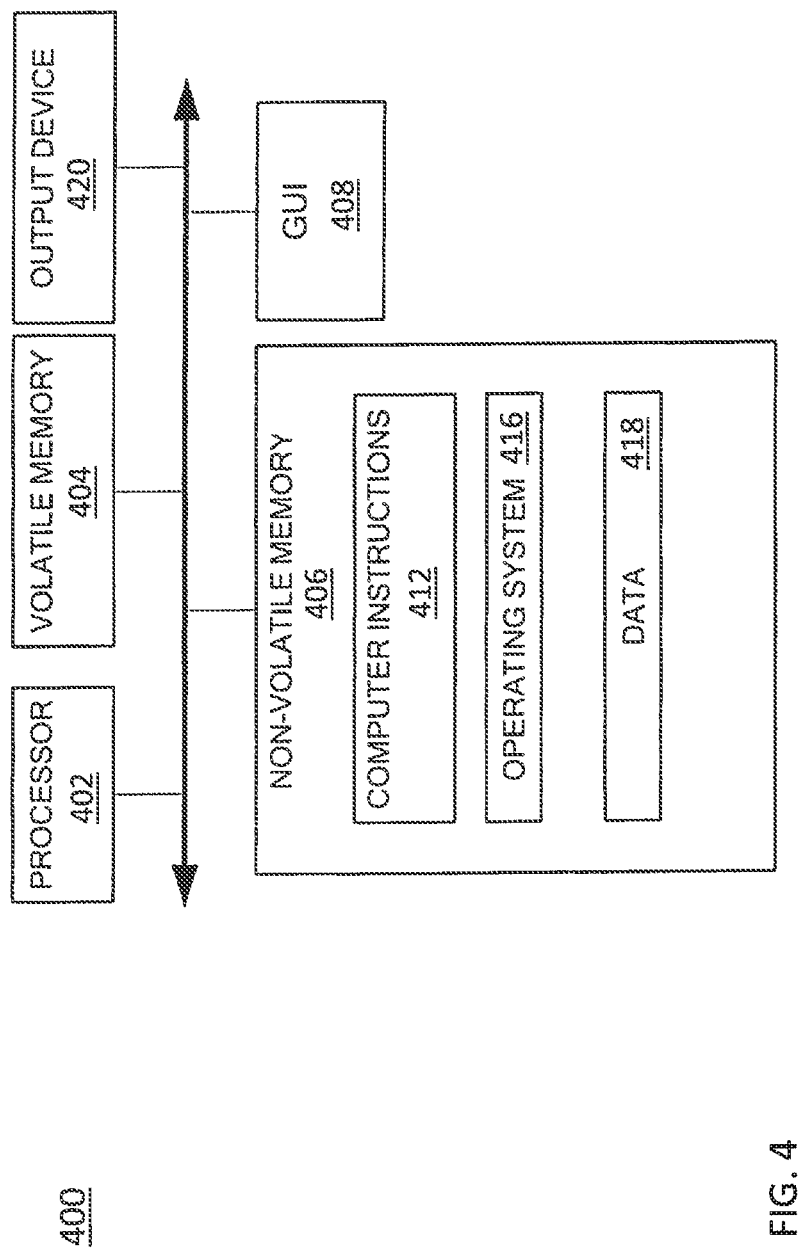
FIG. 4 is a block diagram of a hardware device that may perform at least a portion of the processes shown in FIG. 3.

In some embodiments, the source site 102 and/or target site 112 may be implemented as one or more computers, such as a computer 400 as shown in FIG. 4. Likewise, one or more devices and/or systems of FIG. 2 may be implemented by a computer, such as computer 400. Computer 400 may include processor 402, volatile memory 404 (e.g., RAM), non-volatile memory 406 (e.g., a hard disk drive, solid state drive such as a flash drive, a hybrid magnetic and solid state drive, etc.), graphical user interface (GUI) 408 (e.g., a mouse, a keyboard, a display, and so forth) and input/output (I/O) device 420. Non-volatile memory 406 stores computer instructions 412, an operating system 416 and data 418 such that, for example, the computer instructions 412 are executed by the processor 402 out of volatile memory 404 to perform at least a portion of the processes 300A-300C shown in FIGS. 3A-3C. Program code may be applied to data entered using an input device of GUI 408 or received from I/O device 420.

Processes 300A-300C shown in FIGS. 3A-3C are not limited to use with the hardware and software of FIG. 4 and may find applicability in any computing or processing environment and with any type of machine or set of machines that is capable of running a computer program. Processes 300A-300C may be implemented in hardware, software, or a combination of the two.

The processes described herein are not limited to the specific embodiments described. For example, processes 300A-300C are not limited to the specific processing order shown in FIGS. 3A-3C. Rather, one or more blocks of processes 300A-300C may be re-ordered, combined or removed, performed in parallel or in serial, as necessary, to achieve the results set forth herein.

Processor 402 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow chart of FIG. 3A-3C, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 5:
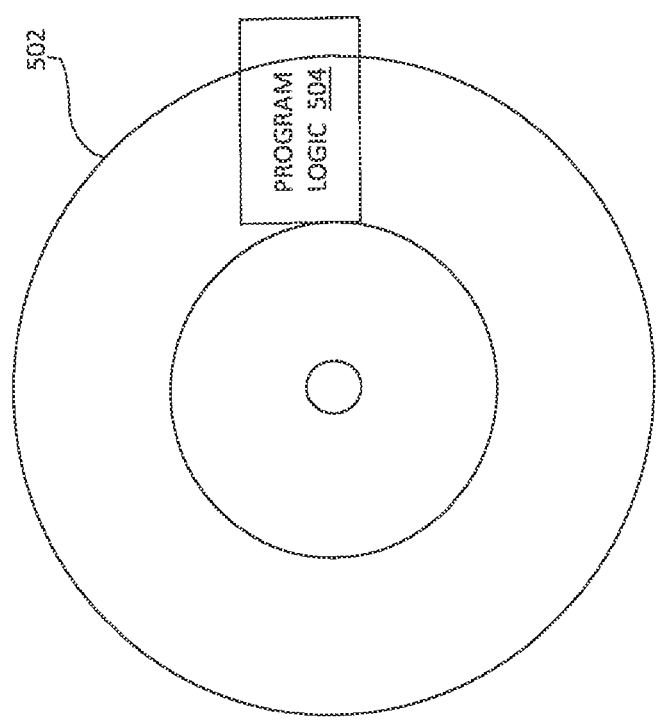
FIG. 5 is a simplified block diagram of an apparatus that may be used to implement at least a portion of the systems of FIGS. 1-2 and 4 and at least a portion of the process of FIGS. 3A-3B.

For example, when the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 5 shows Program Logic 504 embodied on a computer-readable medium 502 as shown, and wherein the Logic is encoded in computer-executable code configured for carrying out the reservation service process of this invention and thereby forming a Computer Program Product 500. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for adaptive replication in a storage system, the method comprising:

during an active replication session in which a first type of replication is performed at the storage system:
monitoring write input/output (IO) operations;
collecting data from the write IO operations;
determining, from the collected data, write IO latency, wherein the write IO latency for the first type of replication includes a length of time taken to mirror the write IO operations from a source cluster to a target cluster; and
upon determining that a threshold value has been met from the write IO latency, wherein the threshold value is defined for the first type of replication, automatically switching from the first type of replication to a second type of replication, wherein the second type of replication is configured to compensate for operational deficiencies detected in response to the write IO latency,
wherein the first type of replication comprises synchronous replication and the second type of replication comprises asynchronous replication, and wherein the threshold value is met when an average value of the write IO latency is persisted for a pre-defined amount of time.

2. The method of claim 1, wherein the threshold value is met when the write IO latency for the first type of replication causes a consistency group trip and recovery after a failed consistency group trip.

3. The method of claim 1, wherein automatically switching to the second type of replication includes:
selecting a most recent recovery snap set pair as a base;
creating identical snap set pairs based on the recovery snap set pair; and
initiating an asynchronous replication cycle.

4. The method of claim 1, wherein the first type of replication comprises asynchronous replication and the second type of replication comprises synchronous replication, wherein the threshold value defines an average and peak latency and the threshold value is met when the write IO latency average and peak IO latency is below the threshold value.

5. The method of claim 4, wherein automatically switching between the first type of replication to the second type of replication includes:
selecting a most recent synchronized snap set pair as a base; and
beginning synchronous replication IO mirroring concurrently with an async-to-sync transition cycle, wherein full synchronization is reached at completion of the async-to-sync transition cycle.

6. The method of claim 1, wherein the threshold value for the first type of replication is a user-tunable value.

7. A system for adaptive replication in a storage system, the system comprising:
a memory comprising computer-executable instructions; and
a processor executing the computer-executable instructions, the computer-executable instructions when executed by the processor cause the processor to perform operations comprising:
during an active replication session in which a first type of replication is performed at the storage system:
monitoring write input/output (IO) operations;
collecting data from the write IO operations;
determining, from the collected data, write IO latency, wherein the write IO latency for the first type of replication includes a length of time taken to mirror the write IO operations from a source cluster to a target cluster; and
upon determining that a threshold value has been met from the write IO latency, wherein the threshold value is defined for the first type of replication, automatically switching from the first type of replication to a second type of replication, wherein the second type of replication is configured to compensate for operational deficiencies detected in response to the write IO latency,
wherein the first type of replication comprises synchronous replication and the second type of replication comprises asynchronous replication, and wherein the threshold value is met when an average value of the write IO latency is persisted for a pre-defined amount of time.

8. The system of claim 7, wherein the threshold value is met when the write IO latency for the first type of replication causes a consistency group trip and recovery after a failed consistency group trip.

9. The system of claim 7, wherein automatically switching to the second type of replication includes:
selecting a most recent recovery snap set pair as a base;
creating identical snap set pairs based on the recovery snap set pair; and
initiating an asynchronous replication cycle.

10. The system of claim 7, wherein the first type of replication comprises asynchronous replication and the second type of replication comprises synchronous replication, wherein the threshold value defines an average and peak latency and the threshold value is met when the write IO latency average and peak IO latency is below the threshold value.

11. The system of claim 10, wherein automatically switching between the first type of replication to the second type of replication includes:

selecting a most recent synchronized snap set pair as a base; and
beginning synchronous replication IO mirroring concurrently with an async-to-sync transition cycle, wherein full synchronization is reached at completion of the async-to-sync transition cycle.

12. A computer program product for adaptive replication in a storage system, the computer program product embodied on a non-transitory computer readable medium and including instructions that, when executed by a computer causes the computer to perform operations comprising:
monitoring write input/output (IO) operations;
collecting data from the write IO operations;
determining, from the collected data, write IO latency; and
upon determining that a threshold value has been met from the write IO latency, wherein the threshold value is defined for the first type of replication, automatically switching from the first type of replication to a second type of replication, wherein the second type of replication is configured to compensate for operational deficiencies detected in response to the write IO latency,
wherein automatically switching to the second type of replication includes:
selecting a most recent recovery snap set pair as a base;
creating identical snap set pairs based on the recovery snap set pair; and
initiating an asynchronous replication cycle.

13. The computer program product of claim 12, wherein the first type of replication comprises synchronous replication and the second type of replication comprises asynchronous replication;
wherein the write IO latency for the first type of replication includes a length of time taken to mirror the write IO operations from a source cluster to a target cluster, and wherein the threshold value is met when an average value of the write IO latency is persisted for a pre-defined amount of time.

14. The computer program product of claim 12, wherein the first type of replication comprises synchronous replication and the second type of replication comprises asynchronous replication; and
wherein the threshold value is met when the write IO latency for the first type of replication causes a consistency group trip and recovery after a failed consistency group trip.

15. The computer program product of claim 12, wherein the first type of replication comprises asynchronous replication and the second type of replication comprises synchronous replication, wherein the threshold value defines an average and peak latency and the threshold value is met when the write IO latency average and peak IO latency is below the threshold value; and
wherein automatically switching between the first type of replication to the second type of replication includes:
selecting a most recent synchronized snap set pair as a base; and
beginning synchronous replication IO mirroring concurrently with an async-to-sync transition cycle, wherein full synchronization is reached at completion of the async-to-sync transition cycle.

* * * * *